US012809049B1

(12) United States Patent
James et al.

(10) Patent No.: US 12,809,049 B1

(45) Date of Patent: Nov. 24, 2026

(54) RADAR-BASED MATERIAL DISCRIMINATION SYSTEM FOR WASTE ANALYSIS

(71) Applicants: Stefany James, San Luis Obispo, CA (US); Penny Lane Case, San Luis Obispo, CA (US); Kylene Landenberger, San Luis Obispo, CA (US)

(72) Inventors: Stefany James, San Luis Obispo, CA (US); Penny Lane Case, San Luis Obispo, CA (US); Kylene Landenberger, San Luis Obispo, CA (US)

(73) Assignee: Nexstera Tech, Inc., San Francisco, CA (US)

( * ) Notice: Subject to any disclaimer, the term of this patent is extended or adjusted under 35 U.S.C. 154(b) by 0 days.

(21) Appl. No.: 18/665,400

(22) Filed: May 15, 2024

(51) Int. Cl.
*G01V 3/12* (2006.01)
*G01S 7/02* (2006.01)
(Continued)

(52) U.S. Cl.
CPC ................ *G01V 3/12* (2013.01); *G01S 7/027* (2021.05); *G01S 7/412* (2013.01); *G01S 13/886* (2013.01); *G01S 2013/0245* (2013.01)

(58) Field of Classification Search
CPC .... Y02W 30/10; B65F 3/00; B65F 2210/128; B65F 2210/138; B65F 1/1484;
(Continued)

(56) References Cited

U.S. PATENT DOCUMENTS 6,501,415 B1 * 12/2002 Viana .................. H01Q 1/3283 342/195
8,642,890 B2 2/2014 Silc et al.
(Continued)

FOREIGN PATENT DOCUMENTS

CN 116500456 A 7/2023

OTHER PUBLICATIONS

Mishra et al., "Prioritized and predictive intelligence of things enabled waste management model in smart and sustainable environment" Aug. 11, 2022.
(Continued)

*Primary Examiner* — Olumide Ajibade Akonai

(74) *Attorney, Agent, or Firm* — Samantha Jones; Vivian Liu; Arielle Agatha San Miguel

(57) ABSTRACT

Hazardous material detection systems can prevent the collection and physical processing of lithium batteries. Wireless electromagnetic sensors detect hazardous materials in containers before the hazardous materials are mechanically processed. The material detection technology can also be used for broader material differentiation capabilities, and may improve data analysis for more informed or accurate material collection, sorting, and recycling. One or more sensors are coupled to vehicles having mechanical lift structures to move contents of bins into storage areas on the vehicles. The sensors can be radar devices that emit electromagnetic signals at a waste bin. Some of the signals are reflected back to the radar sensor and these reflected signals create radar signatures that are analyzed by a processor to determine if the radar signature corresponds to known hazardous materials. If hazardous materials are detected, the vehicle can stop the processing of the bin and issue warning notifications.

13 Claims, 12 Drawing Sheets

(51) Int. Cl.
*G01S 7/41* (2006.01)
*G01S 13/02* (2006.01)
*G01S 13/88* (2006.01)

(58) Field of Classification Search
CPC .................. B65F 2210/168; B65F 1/14; B65F 2210/182; B65F 2003/146; B65F 2210/176; B65F 3/041; G01S 13/74; G01S 13/88; G01S 7/4802; G01S 7/027; G01S 7/412; G01S 13/886; G01S 2013/0245; G01V 3/12
See application file for complete search history.

(56) References Cited

U.S. PATENT DOCUMENTS

| | | | | |
|---|---|---|---|---|
| 9,330,812 | B2 | 5/2016 | Silc et al. | |
| 11,017,049 | B2 * | 5/2021 | Flood | G06K 7/10297 |
| 11,033,194 | B2 | 6/2021 | Chayat et al. | |
| 11,480,535 | B2 | 10/2022 | Lomnitz et al. | |
| 11,520,034 | B2 | 12/2022 | Lomnitz | |
| 11,654,457 | B2 | 5/2023 | Paszti | |
| 11,836,687 | B2 * | 12/2023 | Inan | H04L 69/40 |
| 2005/0057344 | A1 * | 3/2005 | Davis | G08G 1/205 340/425.5 |
| 2007/0200747 | A1 | 8/2007 | Okai et al. | |
| 2007/0268759 | A1 * | 11/2007 | Sabino | B65F 1/1484 365/192 |
| 2014/0295218 | A1 * | 10/2014 | Hakansson | H01M 10/48 429/61 |
| 2015/0108989 | A1 | 4/2015 | Sloop | |
| 2016/0084984 | A1 * | 3/2016 | Franco | G01N 23/04 378/57 |
| 2018/0231388 | A1 * | 8/2018 | Rodoni | G01C 21/3415 |
| 2019/0254544 | A1 | 8/2019 | Chayat et al. | |
| 2020/0082354 | A1 | 3/2020 | Kurani | |
| 2021/0158153 | A1 | 5/2021 | Lee et al. | |
| 2021/0173069 | A1 * | 6/2021 | Wu | G01S 13/343 |
| 2021/0394398 | A1 * | 12/2021 | Lidwell | B29B 17/0042 |
| 2022/0003588 | A1 * | 1/2022 | Volkerink | H04Q 9/00 |
| 2022/0144100 | A1 * | 5/2022 | Tamutus | E01B 25/34 |
| 2022/0212609 | A1 * | 7/2022 | Li | G01S 7/4811 |
| 2022/0365205 | A1 | 11/2022 | Gal et al. | |
| 2023/0266452 | A1 | 8/2023 | Sicron et al. | |
| 2023/0366982 | A1 | 11/2023 | Kim et al. | |
| 2024/0103155 | A1 * | 3/2024 | Tsujimura | G01S 7/03 |
| 2024/0239306 | A1 * | 7/2024 | Ning | B60Q 1/507 |
| 2024/0281994 | A1 * | 8/2024 | Mecheri | G06V 10/44 |

OTHER PUBLICATIONS

Arab et al., "Machine Learning Based Object Classification and Identification Scheme Using an Embedded Millimeter-Wave Radar Sensor" Jun. 23, 2021.

Skaria et al.,"Machine Learning Methods for Material Identification Using mmWave Radar Sensor".

Weib et al., "Material Classification using 60-GHz Radar and Deep Convolutional Neural Network" IEEE Sensors Journal vol. 23, Issue 2, 2022.

Leong et al.,"Obstructed Material Classification Using mmWave Radar with Deep Neural Network for Industrial Applications" Sep. 1, 2022.

* cited by examiner

RADAR-BASED MATERIAL DISCRIMINATION SYSTEM FOR WASTE ANALYSIS

BACKGROUND OF THE INVENTION

Field of the Invention

The technical field of the invention is hazardous material detection.

Description of the Prior Art

Many modern electronic devices use advanced power batteries such as rechargeable lithium-ion batteries that have high energy density, long service life, and low self-discharge rate. Thus, high-capacity lithium-ion batteries are now widely used. A problem with advanced high capacity batteries is that they can be highly flammable when the battery casings are physically damaged. Many rechargeable lithium-ion batteries are integrated and not easily removable from the electronic devices. Ideally, the electronic devices are disposed of at electronic waste facilities that can properly dispose of or recycle the components of the electronic devices including the batteries. However, many electronic devices are thrown into normal garbage bins. When these devices are processed in waste facilities, their lithium-ion batteries can be damaged and potentially causing fires. These fires not only harm the waste processing equipment, vehicles, and facilities but also pose a danger to those working in these structures and to the surrounding environment.

What is needed is a non-destructive hazardous material detection system that can detect high-capacity lithium batteries and stop physical processing to prevent fires caused by damaged lithium batteries. Additionally, what is needed is broader material differentiation capabilities, and improved material data analysis for more informed material collection, sorting, and recycling.

SUMMARY OF THE INVENTION

This invention enables waste management companies to identify hazardous material, e.g. lithium-ion batteries, in bins before collection by a waste processing vehicle. The invention aids in mitigating the risks associated with the intake of harmful hazardous materials, such as lithium-ion batteries, that can cause fires in waste processing vehicles, waste processing facilities, and landfills. The invention can provide a lithium battery detection method that can be used to prevent the collection and physical processing of lithium batteries that can result in fires. The invention uses wireless electromagnetic sensors to detect hazardous materials in holding containers before the hazardous materials are mechanically processed. Holding containers can include bins, waste bins, garbage cans, rubbish bins, dumpsters, litter baskets, trash barrels, wastebaskets, waste containers, and other containers. In particular, the inventive system can be used with waste disposal machinery to prevent the collection and processing of hazardous material in waste collection bins. The inventive system can enable waste management companies to identify hazardous materials, e.g. lithium-ion batteries, in bins before collection by a vehicle. The mechanical processing of lithium-ion batteries can result in physical damage to the battery casing and internal components. This damage can result in battery-induced fires in waste collection vehicles, waste processing facilities, and waste storage landfills. Additionally, the material detection technology can also be used for broader material differentiation capabilities, and may improve data analysis for more informed or accurate material collection, sorting, and recycling.

In an embodiment, a waste collection vehicle can be equipped with one or more sensors. The vehicle can have mechanical structures that can lift the waste bins and move all of the contents of the bins into a storage area on the vehicle. In some embodiments, the sensors can be radar devices that can emit electromagnetic (EM) signals at a waste bin. Some of the EM signals are reflected back to the radar sensor and these reflected signals can create a radar signature that can be analyzed by a processor. The processor can determine if radar signature corresponds to a known hazardous material such as lithium-ion batteries. If a hazardous material is not detected, the vehicle can process the waste normally. The mechanical structures can lift the waste bins and move all of the contents into a storage area on the vehicle and then return the waste bin to the street. However, if a hazardous material is detected, the vehicle can stop the mechanical structures from lifting the bin and a warning notification can be transmitted to the vehicle operator, the bin lifting mechanism, and/or the person associated with the bin by a computer network. Fires in waste collection equipment and at waste collection facilities can be prevented by detecting and stopping the processing of lithium batteries.

BRIEF DESCRIPTIONS OF THE DRAWINGS

DETAILED DESCRIPTION

Figure 1:
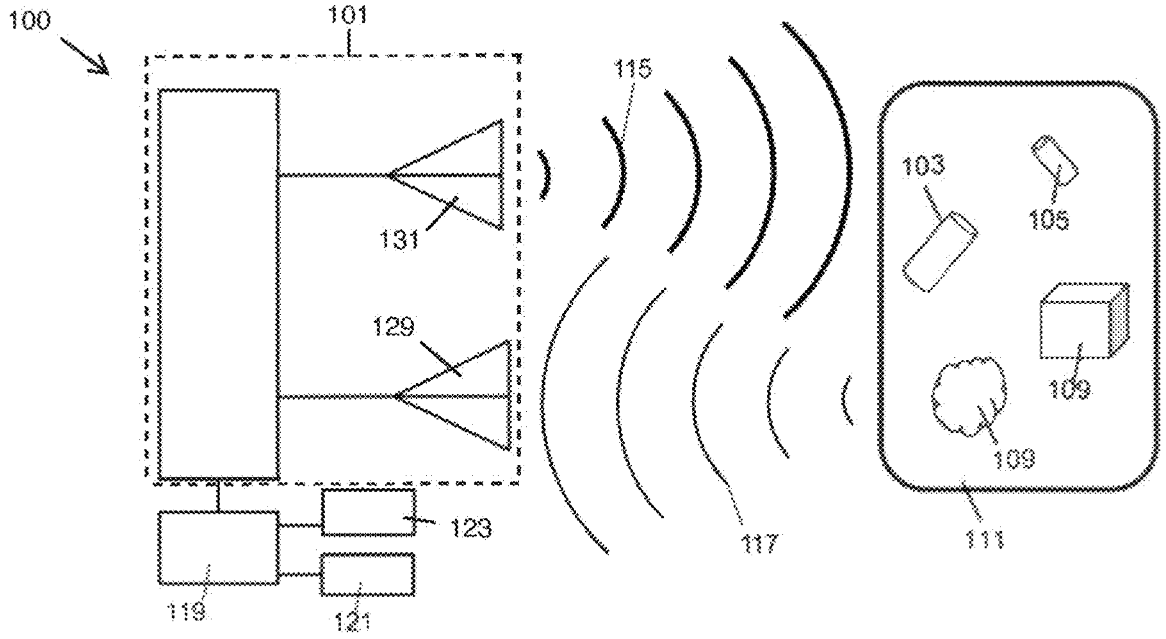
FIG. 1 illustrates a block diagram of an embodiment of a hazardous material detection system.

With reference to FIG. 1, a block diagram of an embodiment of a hazardous material detection system 100 is illustrated. The system includes a sensor assembly 101 that can include an output antenna 131 for emitting radio frequency sensor signals 115 and an input antenna 129 for receiving reflected signals 117. The output antenna 131 can emits radio frequency signals 115 towards a bin 111 and some of the radio frequency signal can be reflected from some of the objects 103, 105, 109, 110 in the bin 111. The reflected radio frequency signals 117 can be detected by the input antenna 129. The sensor assembly 101 can send the reflected radio frequency signals to a processor 119 that can analyze the reflected radio frequency signals and determine if the signals indicate that there are hazardous materials in the bin 111.

In the example, the hazardous materials 103 can be lithium-ion batteries 103. Other non-hazardous objects in the bin 111 can include aluminum cans 105, cardboard boxes 109, and other non-hazardous objects 110. The transmitted radio frequency signals 115 are directed towards the bin 111 and can pass through the bin 111 and contact the objects in the bin 111. Some of the radio frequency signals 115 are reflected. In this example, the radio frequency signals 115 can reflect off of metal objects in the bin 111 including the lithium-ion batteries 103 and the aluminum cans 105. The reflected radio frequency signals 117 can be directed back towards the sensor assembly 101 and be detected by the input antenna 129. The sensor assembly 101 can convert the reflected radio frequency signals 117 into electrical signals that can be transmitted to the processor 119. The processor 119 can then analyze the electrical signals and based on the electrical signals, determine if hazardous materials are in the bin 111. If hazardous materials are detected, the processor 119 can transmit an alarm signal to a transmitter 123 and/or an output device 121. The transmitter 123 can be any type of signal transmitting mechanism that can communicate with other electronic devices through wires, optical communications, and/or wireless communications. The output device 121 can be any type of human detectable mechanism such as an alarm, a light, a visual display, a sound output such as a speaker, a vibration mechanism, etc.

If hazardous materials are detected by the system 100, the processor can emit an alarm to the output device 121 and the alarm can be detected by a bin collection worker. The bin collection worker can be warned that hazardous materials have been detected and the bin collection worker can be instructed to not collect the materials in the specific bin 111.

Figure 2:
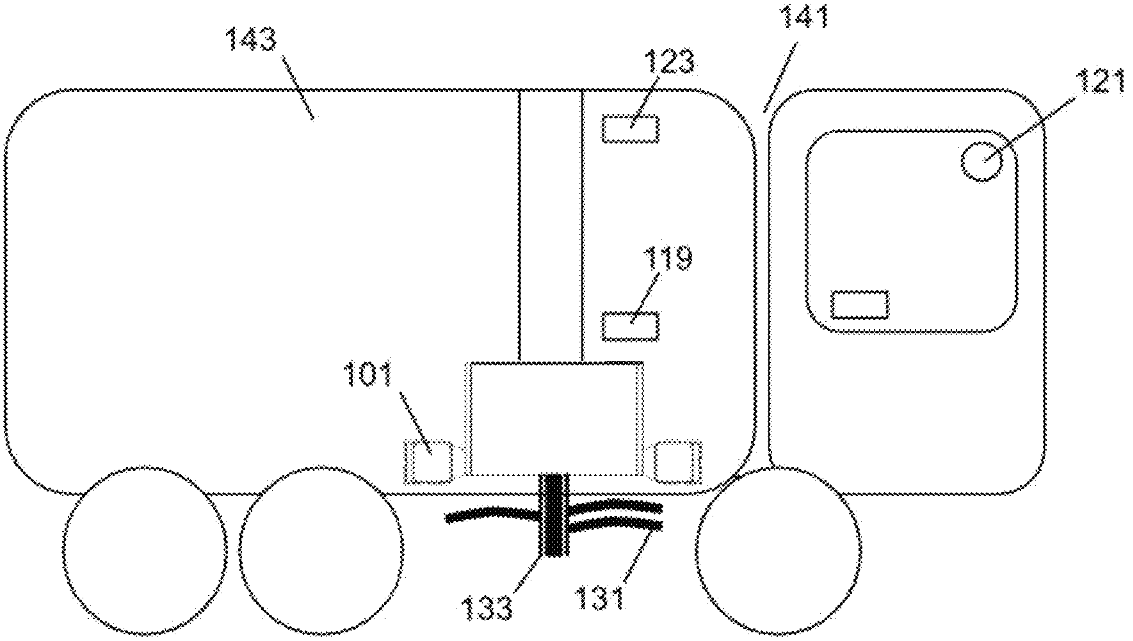
FIG. 2 is a side view of a waste collection truck that has an extendable arm on one side used to pick up garbage bins.

FIG. 2 illustrates a side view of a waste collection truck 141 that has an extendable arm 133 that has a bin grasping mechanism 131 that can be used to pick up waste bins and place the contents of the bin in a collection storage area 143. The extendable arm 133 and bin grasping mechanism 131 can then return the bin to the ground after the contents have been removed. As discussed, a problem with lithium-ion batteries is that they can be highly flammable when the batteries are damaged. Most waste collection trucks 141 include a mechanical mechanism that can move and/or compress waste that has been collected in the collection storage area 143. Lithium-ion batteries can start fires when these mechanisms contact and damage the lithium-ion batteries. The inventive system is intended to warn the operator that a bin contains hazardous material, e.g. lithium-ion batteries, and stop the extendable arm 133 and bin grasping mechanism 131 from collecting the contents of the bin.

In the illustrated embodiment, the hazardous material detection system has been added to the waste collection truck 141. Sensors 101 have been attached to the extendable arm 133 and/or bin grasping mechanism 131. The sensors 101 can transmit radio frequency signals towards the bins and receive reflected radio frequency signals. The sensor assembly 101 can convert the reflected radio frequency signals into electrical signals that are transmitted to the processor 119. The processor 119 can analyze the electrical signals and detect if a hazardous material such as a component of a lithium-ion battery is in the bin. If no hazardous materials are detected, the processor 119 can allow the extendable arm 133 and bin grasping mechanism 131 to lift the bin and empty the contents of the bin into the collection storage area 143.

However, if hazardous materials are detected, the processor 119 can prevent the extendable arm 133 and bin grasping mechanism 131 from lifting the bin and emptying the contents of the bin into the collection storage area 143. The processor 119 can also transmit an alarm signal to an output device 121 that can be in the proximity of a bin collection worker. The alarm can be detected by a bin collection worker and the bin collection worker can then prevent the extendable arm 133 and/or bin grasping mechanism 131 from collecting the materials in the bin 111.

The processor 119 can also transmit a hazardous material detection signal to a transmitter 123 that can emit a hazardous material detection signal wirelessly to a server computer. The hazardous material detection signal can indicate the location of the hazardous material and the type of hazardous material such as a lithium-ion battery. The server computer can forward the location and the type of hazardous material information to a bin collection company. The company can identify the user associated with the bin and transmit a notification that a hazardous material such as a lithium-ion battery has been detected in the customer's waste bin and for this reason, the contents of the bin have not been collected.

Figure 3:
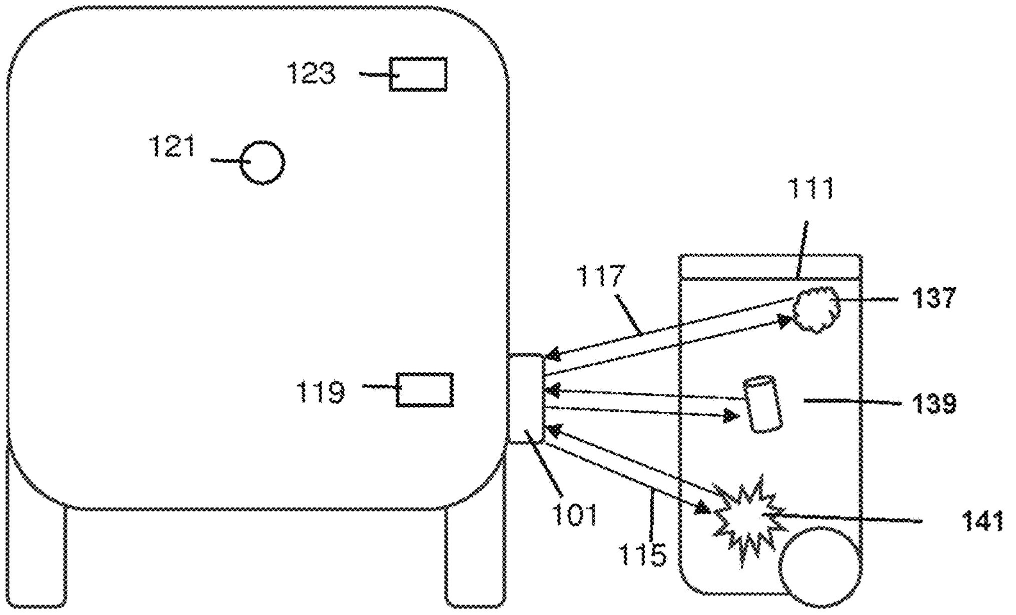
FIG. 3 is a rear view of a waste collection truck with the sensor system at one side.
Figure 4:
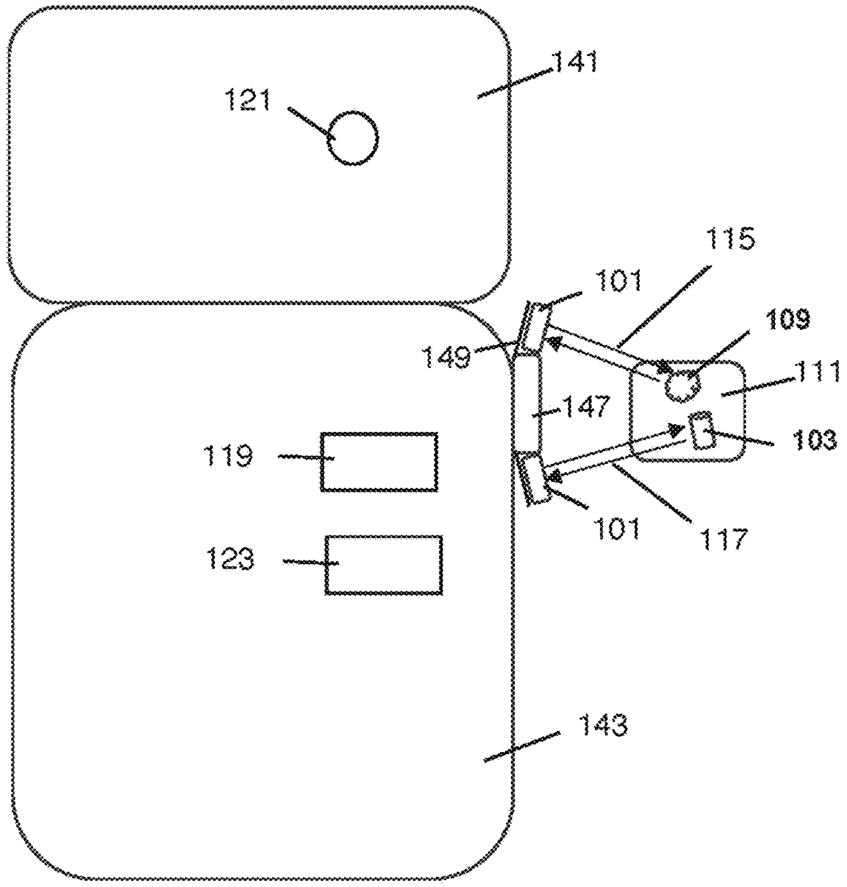
FIG. 4 is a top view of a waste collection truck with the sensor system at one side.

FIG. 3 is a rear view of a waste collection truck 141 with the sensor system 100 and FIG. 4 is a top view of a waste collection truck 141 with the sensor system 100. The sensors 101 are mounted to a bracket 149 and positioned on opposite sides of a bin lifting mechanism 147. The bracket 149 angles the sensors 101 towards each other and directs the sensor antenna arrays towards a waste bin 111 and radio frequency signals 115 are transmitted from the sensors 101 towards the bin 111. In different embodiments, the sensor ends of the bracket 149 can be angled inward between 5 to 45 degrees from a straight line defined by the center portion of the bracket 149. The radio frequency signals 115 travel through the bin 111 and contact the objects 103, 110, 106 in the bin 111 and some of the signals are reflected. Some of the reflected radio frequency signals 117 are directed back towards the sensors 101. The sensor assembly 101 converts the reflected radio frequency signals 117 into electrical signals and transmits the electrical signals to the processor 119. The processor 119 can analyze the electrical signals and detect if lithium-ion batteries are in the bin.

Figure 5:
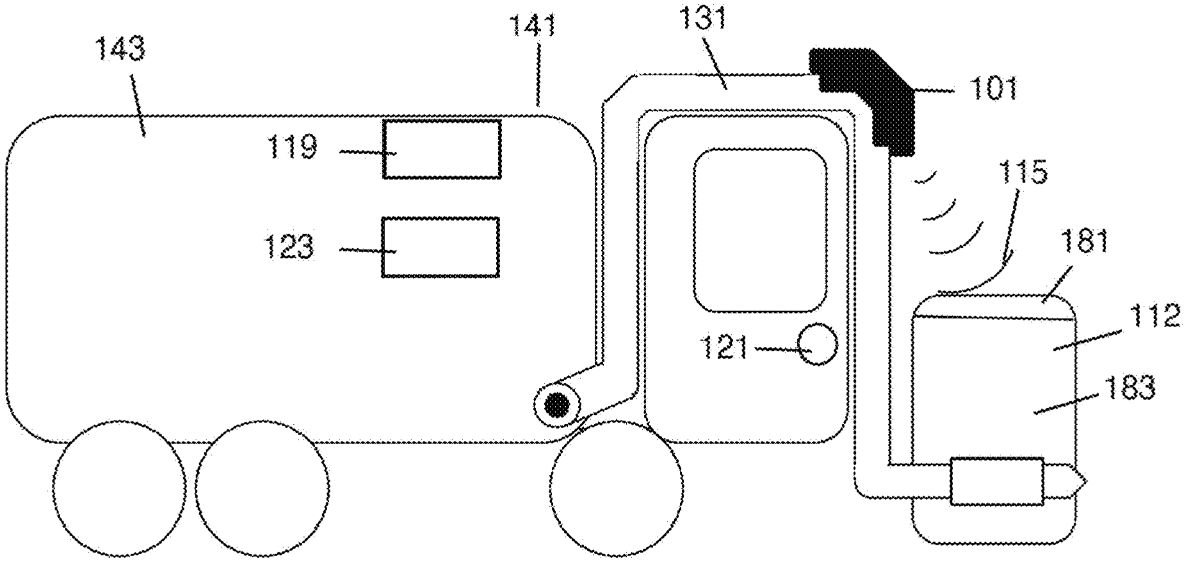
FIG. 5 is a side view of a waste collection truck with a front loader holding a dumpster.
Figure 6:
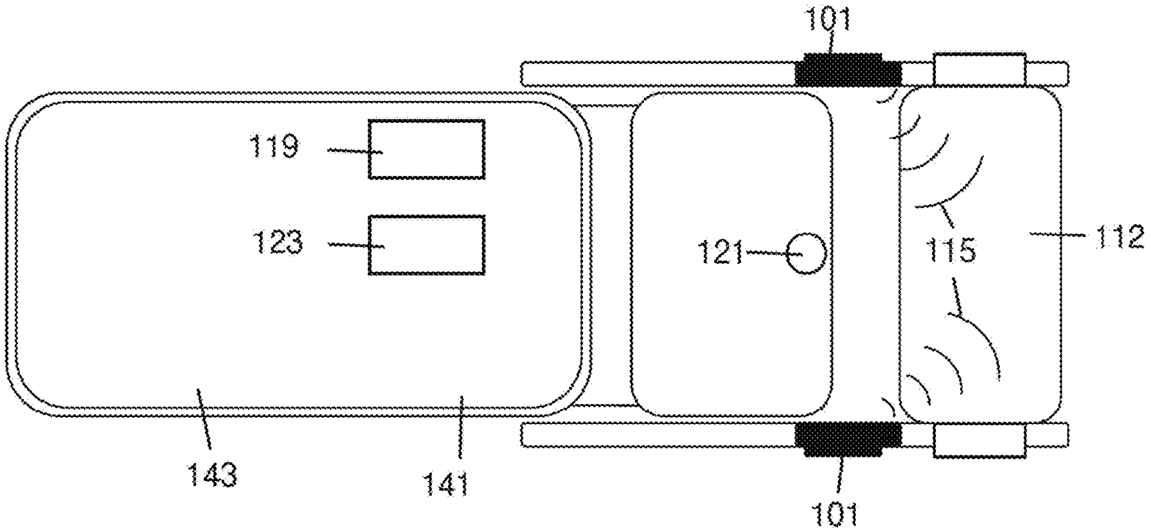
FIG. 6 is a top view of a waste collection truck with a front loader holding a dumpster

FIG. 5 illustrates a side view of a waste collection truck 141 with a front dumpster loader 131 coupled to the front portion of the truck 141 and FIG. 6 is a top view of this front loader vehicle 141 with a front dumpster loader 131. The front dumpster loader 131 can include two horizontal beams that can fit within two horizontal tubular structures that are rigidly coupled to opposite sides of the dumpster 112. The dumpster 112 can be on the ground and the waste collection truck 141 can move towards the dumpster 112 with the horizontal beams aligned with two horizontal tubular structures. The horizontal beams can be fully inserted through the horizontal tubular structures. If no hazardous materials are not detected, the front dumpster loader 131 can lift the dumpster 112 and empty the contents into a storage area. If hazardous materials are detected, the front dumpster loader 131 can leave the dumpster 112 and not collect any of the contents of the dumpster 112.

In the illustrated embodiment, the sensors 101 are mounted on an upper portion of the front dumpster loader 131 so that the sensor radio frequency signals 115 can be directed downwards towards the waste dumpster 112. The dumpster 112 can have a metal body 183 and a plastic top cover 181. The plastic top cover 181 can be transparent to radio frequency signals 115 and enables them to enter the interior volume of the dumpster 112 to detect hazardous materials in the dumpster 112. Because the dumpster body 183 can be made of a metal material, radio frequency waves 115 transmitted by a side mounted sensor assembly 101, such as those shown in FIGS. 3 and 4, may not penetrate the dumpster 112 and may not be able to detect hazardous materials inside the dumpster 112.

These radio frequency signals 115 can contact the objects in the dumpster 112 and some of the radio frequency signals will be reflected back up and out of the dumpster 112. Some of the reflected radio frequency signals will be detected by the sensors 101 and the reflected signals will be processed by the processor 119 as described above. If a hazardous material is detected, the processor 119 can transmit an alarm signal to an output device 121 to warn a vehicle operator that the dumpster 112 contains hazardous materials. The processor 119 can also transmit a stop signal to stop the front dumpster loader 131 from lifting and emptying the dumpster 112. The processor 119 can also transmit a hazardous material detection signal to a transmitter 123 that can notify a supervisor or a waste management company of the location of the hazardous material.

Figure 7:
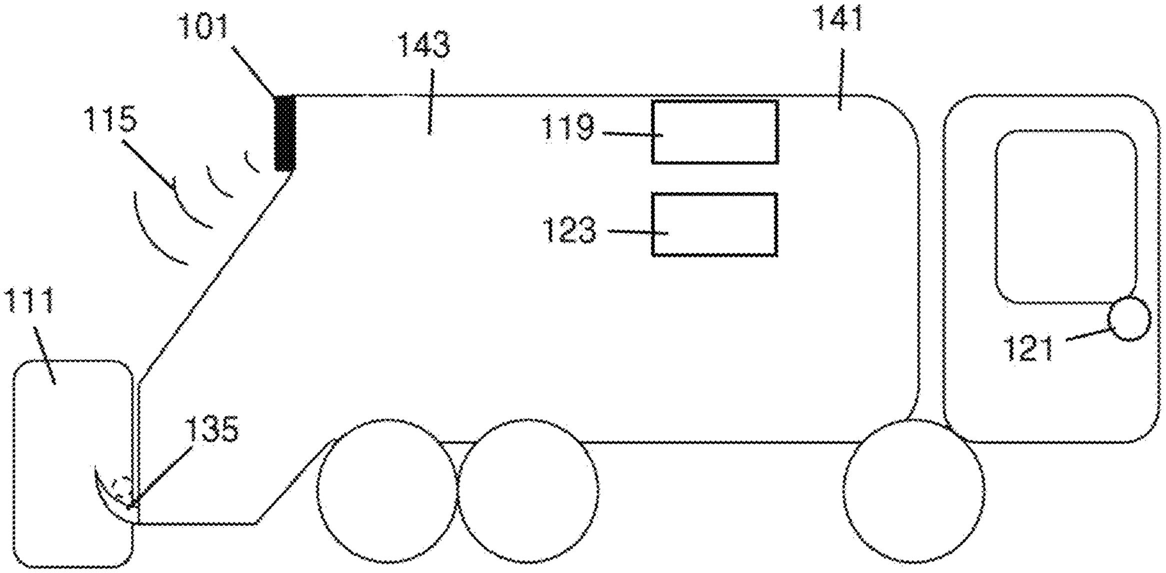
FIG. 7 is a side view of a waste collection truck with rear loader holding a curbside bin.
Figure 8:
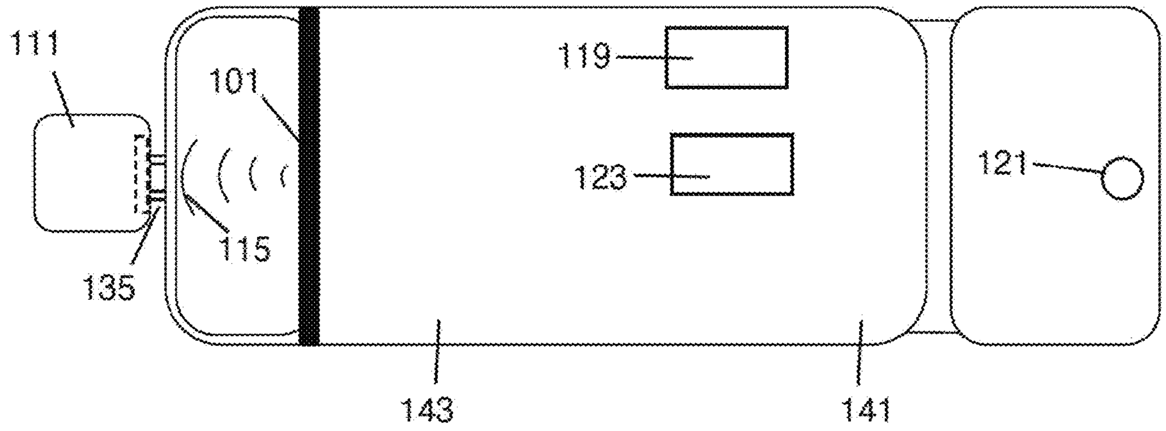
FIG. 8 is a top view of a waste collection truck with rear loader holding a curbside bin.

FIG. 7 illustrates a side view and FIG. 8 illustrates a top view of a waste collection truck 141 with a rear loader 135 with a curbside bin 111. The bin 111 can be manually moved to the rear loader 135 or it may be possible to move the waste collection truck 141 so that the rear loader 135 physically engages with the bin 111. In this embodiment, the sensor assembly 101 can be a single unit mounted to an upper portion of the waste collection truck 141. As the bin 111 is moved towards the sensor assembly 101 or the sensor assembly 101 is moved towards the bin 111, and after the bin 111 is in the rear loader 135, the sensor assembly 101 can emit radio frequency radar signals 115 down towards the bin 111 before the waste is collected. The entire bin 111 can be made of a plastic material so that the emit radio frequency signals 115 can pass through the bin 111 and contact all of the objects in the bin 111. Some of the radio frequency signals will reflect off of hazardous and non-hazardous materials and be received by the sensor assembly 101. The processor will then process the signals and identify any hazardous materials in the bin 111. If a hazardous material is detected, the processor 119 can transmit an alarm signal to an output device 121 to warn a vehicle operator that the bin 111 contains hazardous materials and/or transmit a stop signal to stop the rear loader 135 from lifting and emptying the curbside bin 111. The processor 119 is also capable of sending a signal for hazardous material detection to a transmitter 123. The transmitter 123 can then inform a supervisor or waste management company about the location of the hazardous material, along with the date and time of detection.

Figure 9:
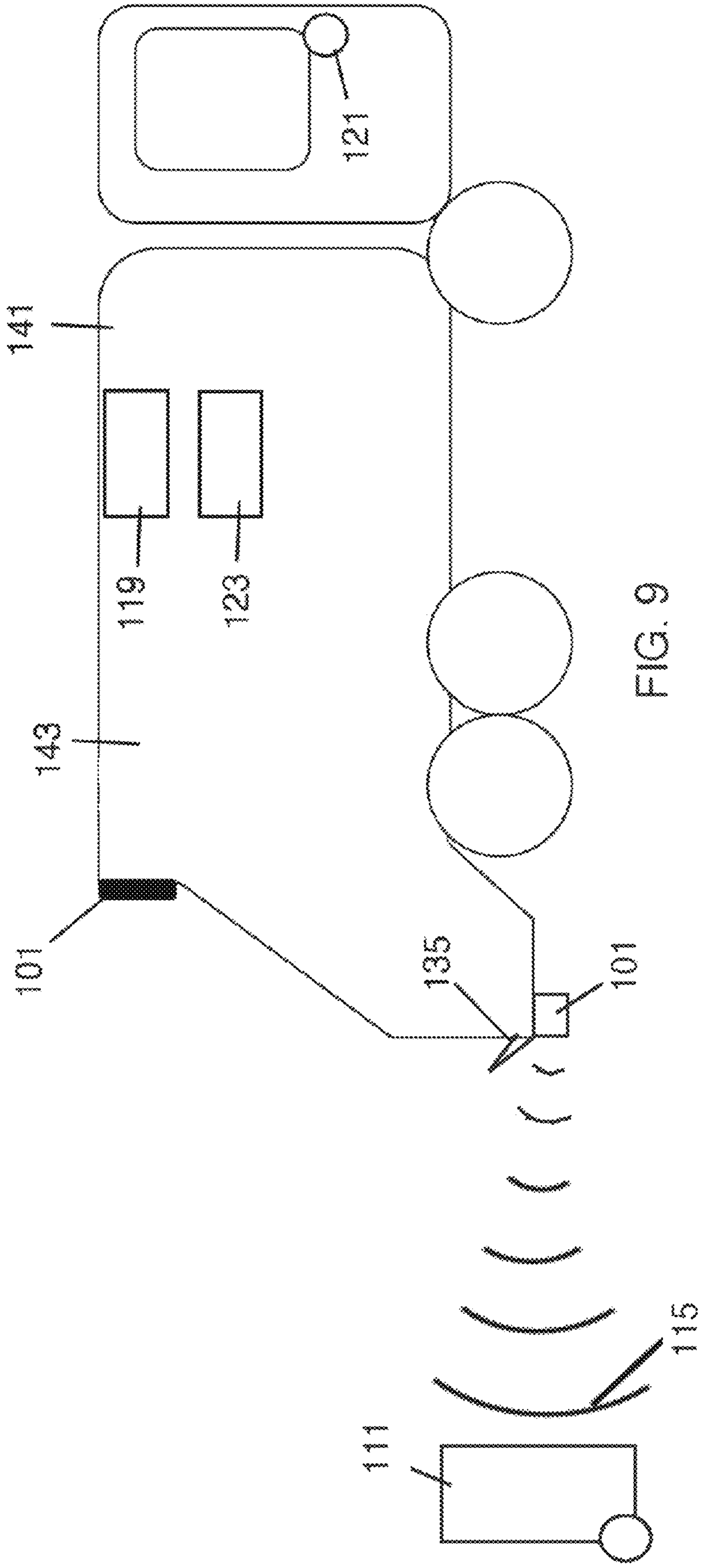
FIG. 9 is a side view of a waste collection truck with rear loader near a curbside bin.

FIG. 9 illustrates a side view of a waste collection truck 141 with a rear loader 135 near a curbside bin 111. In the illustrated embodiment, a sensor assembly 101 is mounted beneath the chassis of the waste collection truck 141 adjacent to the rear loader 135. However, the location of the sensors 101 is not limited to the top, bottom, or side of the waste collection truck 141. The sensor assembly 101 can emit radio frequency signals 115 that can pass through the side walls of the curbside plastic bin 111. The radio frequency signals 115 can contact the objects in the bin 111 and any hazardous materials can be detected as described above. In other embodiments, placement of the sensors 101 can be at any location that has a direct line of sight with a plastic or radar transparent portion of the waste bin 111 or dumpster. Radio frequency signals, upon reflection from both hazardous and non-hazardous materials, are received by sensor assembly 101. The processor 119 analyzes these signals to detect hazardous materials within the bin 111. Upon detection, the processor 119 can activate an alarm signal to warn the vehicle operator and/or issue a stop signal to prevent the rear loader 135 from lifting and emptying the bin 111. Additionally, the processor 119 can transmit a hazardous material detection signal to transmitter 123, which can notify a supervisor and/or waste management company of the hazardous material's location, date, and time of detection. The lower mounted sensor assembly 101 can be used alone or in combination with any of the other described sensor configurations.

Figure 10:
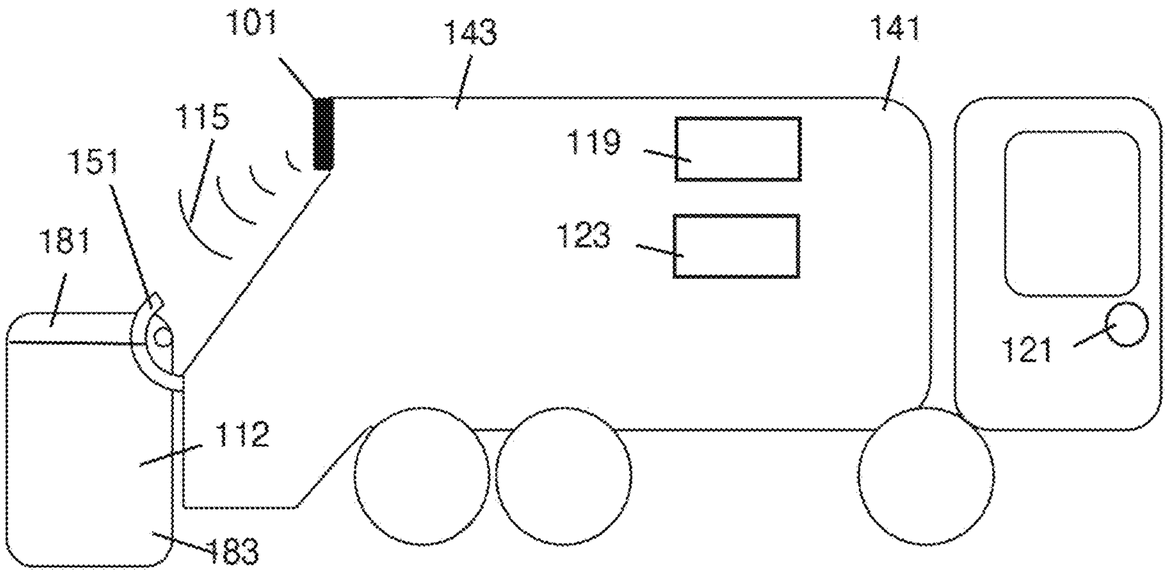
FIG. 10 is side view of a waste collection truck with rear loader holding a dumpster.
Figure 11:
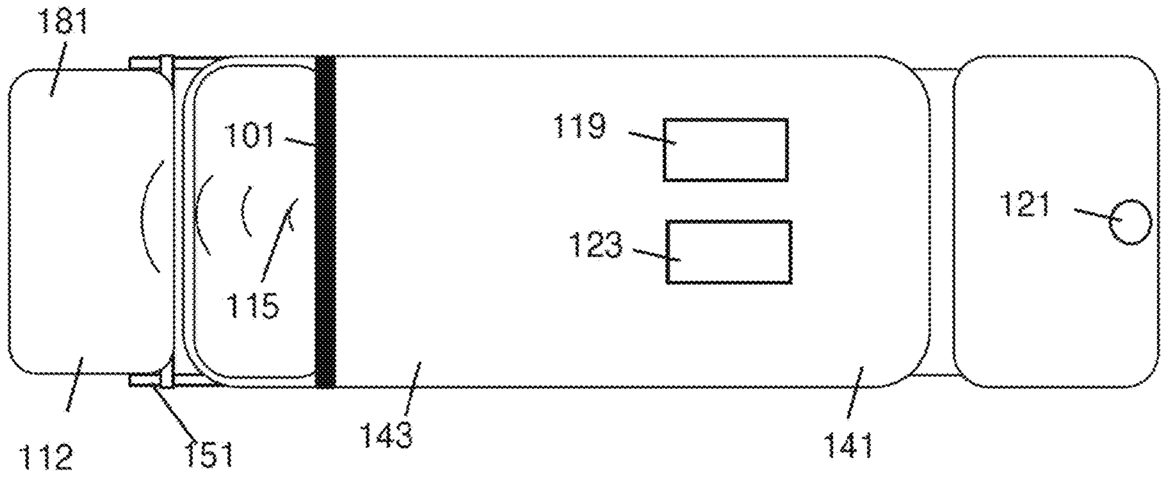
FIG. 11 is a top view of a waste collection truck with rear loader holding a dumpster.

FIG. 10 illustrates a side view and FIG. 11 illustrates a top view of a waste collection truck 141 with a rear loader 151 and a dumpster 112. In the illustrated embodiment, the dumpster 112 can have a metal body 183 and a plastic top cover 181. The dumpster body 183 can be made of a metal material such as steel that can block radio frequency waves 115. In contrast, the plastic top cover 181 can be transparent to radio frequency signals 115 and allow them to enter the interior volume of the dumpster 112 to detect hazardous materials in the dumpster 112. The dumpster 112 can have two lifting pegs on opposite upper sides. The rear loader 151 can have hook mechanisms that can be placed under the pegs and used to lift the dumpster 112 and empty the contents into the rear portion of the waste collection truck 141.

In this embodiment, the sensor assembly 101 can be a single housing mounted to an upper rear portion of the waste collection truck 141. The sensor assembly 101 can emit radio frequency signals 115 down towards the dumpster 112. Some of the radio frequency signals will reflect off of hazardous and non-hazardous materials and be received by the sensor assembly 101. If a hazardous material is detected in the dumpster 183, the processor 119 can transmit an alarm signal, e.g. a sound or light signal, to an output device 121 to warn a vehicle operator that the dumpster 183 contains hazardous materials. The processor 119 can also transmit a stop signal to stop the rear loader 151 from lifting and emptying the dumpster 183. The processor 119 can also transmit a hazardous material detection signal to a transmitter 123. The transmitter 123 can notify a supervisor and/or waste management company of the location, date, and time of the hazardous material detection, enabling them to inform the customer and/or user of the dumpster 183.

Each radar sensor assembly 101 can have an array having multiple RF output emission modules. An array like this with a matrix of transmission antenna would be considered one radar module that is generalized to the singular RF emission as illustrated. In the illustrated vehicle mounted embodiments, each sensor system includes one or two sensors arrays 101. While this may be sufficient for most applications, in other embodiments the system can include three or more radar sensors. An advantage to having two or more radar sensors is increased dumpster and bin penetration capabilities. If the dumpster or bin is made of materials that include highly RF absorptive or RF reflective materials that can block a line of sight view of a hazardous material deeper inside a dumpster or bin, a second, third, or forth radar sensor assembly 101 would help to emit RF output sensor signals at angles and positions that can be more likely to penetrate the dumpster or bin than a singular radar sensor emission.

Figure 12:
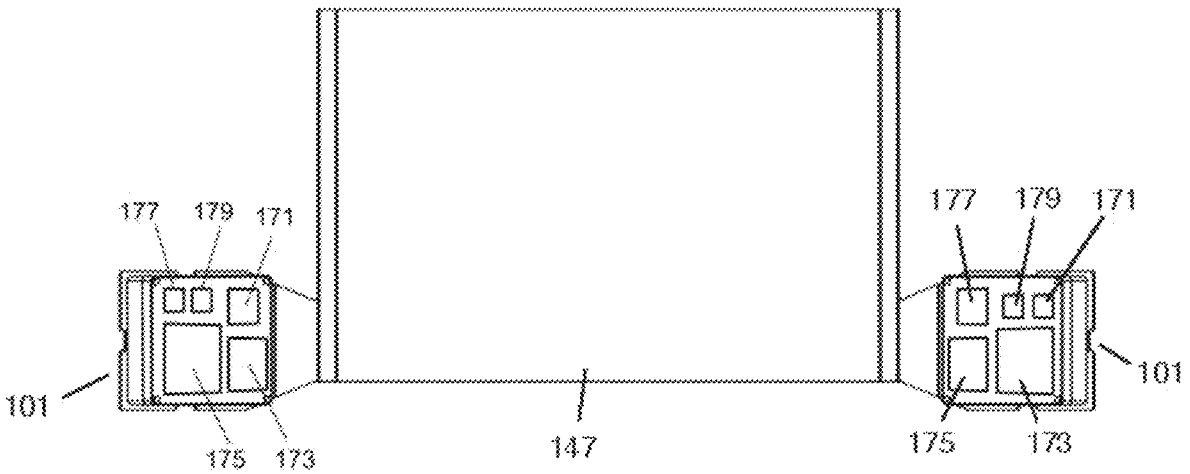
FIG. 12 illustrates a front view of a material detection mechanism having multiple radar sensors.

FIG. 12 illustrates a front view of an embodiment of a hazardous material detection system having six radar sensor transceiver module antenna 171, 173, 175 that operate at different frequencies, deployment sensor 177, and environmental sensor 179. Each of the transceiver module antenna 171, 173, 175 and sensors 177, 179 can be mounted on opposite sides of the bin lifting mechanism 147 as radar sensor assemblies 101 on opposite ends of the bracket 149. The sensor ends of bracket 149 can be angled inward between 5 to 45 degrees from a straight line defined by the center portion of bracket 149.

The first pair of radar module antenna 171 can be in an M×N rectangular array of a high frequency chirp range. For example, the first pair of radar transceiver module 171 can operate at a "high frequency" range between 70-90 GHz. The second radar transceiver module 173 can be an M×N array of antennas operating a "mid-range frequency." For example, the second radar module antenna 173 can operate at a range between 20-30 GHz or 24 GHz. The third radar transceiver module 175 can also be an M×N array of antennas that operate at a "low-range frequency." For example, the third radar module antenna 173 can operate at a range between 8-13 GHz or 10.5 GHz. The smallest radar transceiver module 171 could operate at the maximum millimeter-wave frequency of the system, while the largest radar transceiver module 175 could be emit the minimum frequency, which could fall in the microwave range.

Deployment sensor 177 can be a 9-axis inertial measurement unit (IMU) that can include gyroscopes, accelerometers, and a magnetometer to measure orientation, velocity and gravitational forces. The IMU measurements can be combined with detection data from one or more of the radar transceiver modules 171, 173, 175 to capture the movement data for a holding container about to be picked up for collection. Environmental sensor 179 can include a thermocouple, a humidity sensor, and/or other sensors, to ensure optimal operating conditions of the system.

The environmental conditions may also alter the radar hazardous material sensor readings. In order to compensate for the altered sensor readings, correction factors can be applied to the hazardous material sensor readings based on the temperature and humidity conditions detected by the environmental sensor 179. A correction factor(s) can be calculated based on the environmental sensor 179 measurements. The correction factor(s) can then applied to the hazardous material detection algorithm, or alternatively the material sensor data fulfilling a certain material detection parameter can use a different algorithm that can be adjusted for the environmental conditions the environmental sensor 179 has detected. For example, the system can use a first algorithm for analyzing hazardous material data collected at a temperature and humidity that is within a first range of values and the system can use a second algorithm for analyzing hazardous material data collected at a temperature and humidity that is within a second range of values that are higher or different than the first range of values.

In the event that the environment is no longer within the designed operating range of the system based on measurements from the environmental sensor 179, the environmental sensor 179 can instruct the processor 119 to power down necessary modules of the system.

With reference to FIG. 1, in some embodiments, the radio frequency signals 115 emitted by the sensors 101 can be the same while in other embodiments, the emitted radio frequency signals 115 by the two sensors 101 can be different. Due to FCC regulations, the system may only be sequentially deployed, meaning a first sensor assembly 101 can deploy a first RF chirp, and the first sensor assembly 101 can receive the first reflected RF chirp. Subsequently, the second sensor assembly 101 can transmit a second RF chirp, and the second sensor assembly 101 can receive the second reflected RF chirp. This process can proceed, back and forth alternating between the two sensors 101. While the RF signals 115 are emitted at the speed of light, they may not be happening at the same time. Therefore, signals outputted by the first sensor will be detected by the first sensor, while signals by the second RF chirps will be detected by the second sensor assembly 101.

In other embodiments, a synchronous deployment of RF modules is also possible. This can be much more difficult to achieve on the automated side loader configuration. In the rear loader configuration, there may be a sensor housing spanning the entire width of the truck, a first radar sensor assembly 101 can emit an RF chirp and a second radar sensor assembly 101 can receive the reflected RF chirp data. In some embodiments, an RF chirp can be transmitted by a first sensor assembly 101 and reflected RF chirp signals can be detected by both the first sensor assembly 101 and the second sensor assembly 101. Thus, both the first and second sensors 101 can receive reflected RF data at the same time.

Because radar systems often rely on the phase of the received signal to determine the characteristics of the scanned material, maintaining phase coherence between the transmitted signal and the signal received by the second sensor assembly 101 can become complex due to signal scattering and multipath effects. Precise positioning of the transmitter relative to the receiver is necessary. In the rear loader configuration, precise angles and distances between a transmitter and receiver can be accomplished. The more the transmitter and receiver are separated, the more complex it is to maintain synchronization and timing.

Figure 13:
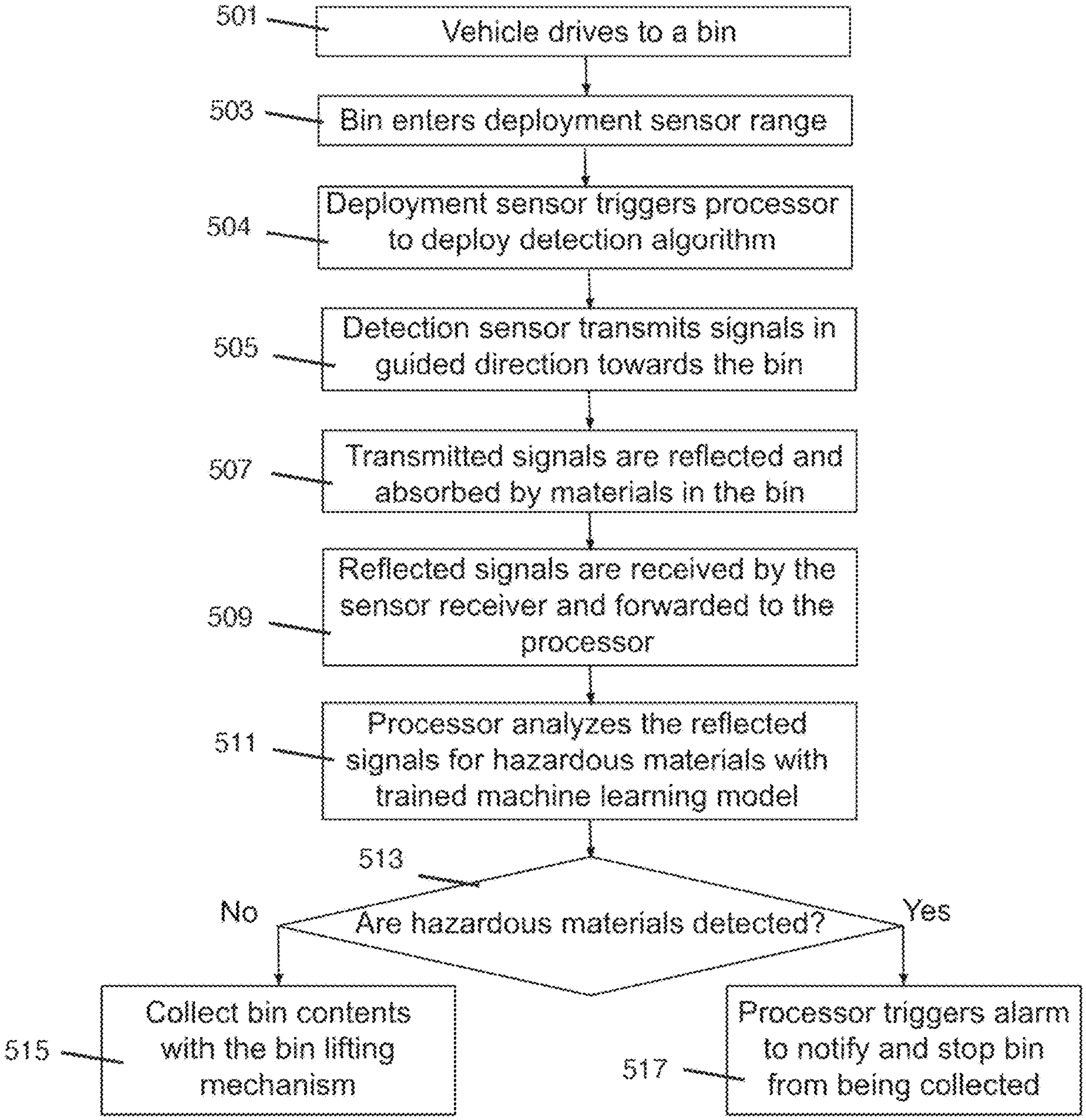
FIG. 13 illustrates a flowchart for a process for using the hazardous material detection system.

FIG. 13 illustrates a flowchart for a process for using the hazardous material detection system. In an embodiment, a waste processing vehicle can drive to a waste bin 501. The vehicle can stop near the waste bin and a hazardous material sensor can be moved towards the bin or the bin can be moved near the sensor. The sensor can face the bin and move into a sensor range of bin 503. A deployment sensor can trigger the processor to deploy a hazardous material detection algorithm and process 504. A processor coupled to the sensor can instruct the sensor to emit an electromagnetic signal from a transmitter guided in a direction towards a bin 505. The electromagnetic signals can pass through a plastic portion of a waste bin and can contact all materials in the bin. Some of the electromagnetic signals will pass through or be absorbed by the bin and waste materials while some other electromagnetic signals will reflect off of the waste material objects in the bin 507. Some of the reflected signals are received by the sensor receiver and converted into electrical signals that are forwarded to the processor 509.

The processor can analyze the reflected signals and determine if any of the reflected signals indicate the presence of hazardous material, such as lithium batteries 513. If no hazardous materials are detected, the vehicle can collect the waste materials from the bin with a bin lifting mechanism 515. After the waste materials have been collected, the bin lifting mechanism can return the empty bin to the street or curb. Alternatively, if hazardous materials are detected, the processor can emit a warning signal and stop the bin lifting mechanism from collecting the contents of bin 517. It can also send an alert to the vehicle driver and notify the waste management company about the location, date, and time of the hazardous material detection. This allows them to inform the customer and/or user of the bin. The vehicle can then move to the next waste bin and the described process can be repeated.

Some of the electromagnetic signals will pass through or be absorbed by the bin and waste materials while some other electromagnetic signals will reflect off of the waste material objects in the bin 507. Some of the reflected signals are received by the sensor receiver and converted into electrical signals that are forwarded to the processor 509. The processor can analyze the reflected signals and determine if any of the reflected signals indicate a hazardous material detected 513. If no hazardous materials are detected, the vehicle can collect the waste materials from the bin or dumpster lifting mechanism 515. After the waste materials have been collected, the bin lifting mechanism can return the empty bin to the street or curve. Alternatively, if hazardous materials are detected, then the processor can emit a warning signal and the processor can stop the bin lifting mechanism from collecting the contents of the bin 517. The processor can also transmit to a system server, information such as the type of detected hazardous materials, the location of the hazardous materials, the time that the hazardous materials were detected, etc. This information can be sent to the customer associated with the waste bin or dumpster with an explanation of why the contents of the bin or dumpster had not been collected. The vehicle can then move to the next waste bin and the described process can be repeated.

Radar Sensors

As discussed, the system sensor can use frequency modulated, continuous wave (FMCW) radar. This radar's signal can be continuously varied between a certain range of frequencies. For example, the range of frequencies can be super high frequency (SHF)-K band 24.05-24.25 GHz or the extremely high frequency (EHF)-V band 61-61.5 GHz for the FMCW synthetic aperture radar (SAR) which are Federal Communications Commission (FCC) approved frequency ranges. In other embodiments, it is possible to use other frequency ranges of FCC approved frequency allocations that are listed in 47 CFR § 2.106b "FCC Table Of Frequency Allocations." Other possible operating frequencies of the radar sensor include: 2.40-2.50 GHz ultra high frequency (UHF), 3.3-3.8 GHz (SHF), 4.4-5.0 GHz (SHF), 5.725-5.875 GHz (SHF), 10-16 GHz (SHF), 24-39 GHz (SHF/EHF), 57-64 GHZ (EHF), and 95-105 GHZ, 122-123 GHZ (EHF-D band), and 244-246 GHz (EHF-G band).

In some embodiments, the radar sensor modules can be phased array antennas (PAAs), which can be capable of beamforming and can be capable of beam steering upon phase differences across each transmitter element, caused by phase shifters in each antenna. The radar sensor modules can use different frequencies. Frequency modulation allows the processor to identify and differentiate different materials due to the difference in electromagnetic properties that every material has. For example, PAAs can be used to identify the different material components within a lithium-ion or other battery: the cathode, electrolyte, and even the anode, separator, and casing which can each have distinct dielectric constants and loss tangents that create unique radar signatures. To further improve the system's ability to identify the different materials, the sensor can use modulation of the operating frequencies. Because each material interacts differently with each frequency, modulating the operating frequencies during the material detection process can allow the system to better distinguish materials from one another. In some embodiments, the detection of one or more lithium-ion or other battery components can result in the system identifying a hazardous material.

The radar cross section (RCS) or radar signature is a measure of how detectable an object is by radar. A larger RCS can indicate that a component object is more easily detected. The radar emits energy towards a target object and the target object reflects a limited amount of radar energy back to the radar source. The factors that influence the RCS can include: the material with which the target object is made of; dielectric properties of the target object materials; the size of the target object relative to the wavelength of the illuminating radar signal; the absolute size of the target object; the incident angle which is the angle that the radar beam hits a particular portion of the target object, which depends upon the shape of the target object and the orientation of the target object relative to the radar source; the reflected angle which is the angle that the reflected electromagnetic (EM) beam leaves the part of the target object hit by the EM beam that depends upon incident angle; and the polarization of the radiation transmitted and received with respect to the orientation of the target.

The radar signature that is received by the radar and forwarded to the processor to identify a material can be influenced by various detectable material properties. The dielectric properties of the waste materials can be detected based on the interactions of dielectric materials with the EM radiation from the transmitter of the sensor. Reflection data for the waste materials can be detected from the reflected RCS received by the sensor receiver. Some EM radiation is absorbed or transmitted through the bin and this EM radiation is not received as reflected EM radiation by the radar sensor receiver. This non-reflected EM radiation can also be information that is used by the processor to analyze and identify the materials scanned via the system's machine learning (ML) model. An important aspect of FMCW can be continuity.

Figure 14:
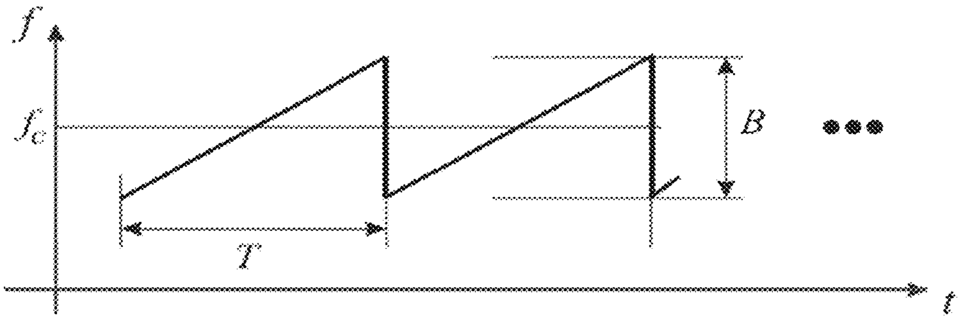
FIG. 14 illustrates a graph showing a sawtooth chirp waveform, characterized by repeated frequency increases over time.

FIG. 14 illustrates an example of a FMCW where the frequency output by the sensor can increase over time t at a constant rate from $f_c$–B/2 to $f_c$+B/2 over a time period T. The frequency then drops to $f_c$–B/2 and the process repeats. The FMCW can result in a change in the radar signature for the objects over time and because each material can interact and respond differently to the exposure to different frequencies, this sensor data can help the processor identify material properties. The system can detect changes in phase and amplitude of the returned EM signal. These material interactions with the radar signals manifest not only as EM reflections but also the EM absorption and transmission for different materials can be used by the inferred thereof. FIG. 14 illustrates a ramped frequency output that increases over time and then drops back to the lowest frequency. It is also possible for the FMCW to use a frequency output that can decrease in a decreasing ramp over time and the raises back up to the highest frequency in a repeating manner.

Hazardous material batteries can come in various shapes, sizes, and assembled or disassembled structures. It can be important to identify all possible configurations of hazardous material batteries. The system can identify different geometric shapes, thicknesses, and layering configurations of the hazardous batteries in this context. For example, prismatic and pouch batteries can have components in a layered configuration while cylindrically-cased batteries can have components spirally wrapped into a cylindrical structure. These difference constructions will also influence the detected radar signatures. Increasing the frequency diversity can increase the amount of information that an ML algorithm running a processor can use to assess the presence of a hazardous li-ion battery in a noisy environment.

Sensors emitting EM signals in the 24 GHz frequency range can be very useful for curbside waste disposal, recycling, and other applications because 24 GHz can penetrate through papers, plastics, wood, and many common recyclables, with little signal losses. Higher signal frequencies can increase the likelihood that non-metal objects are unable to be penetrated by the EM signals, making it much harder for the signal to reach an internal battery surrounded by recyclable waste in a bin. Higher signal frequencies can also make it harder for any reflected EM signals to return to the sensor receiver with enough signal strength for detection, due to the increased scatter of the EM signals from reflection and therefore higher loss. Lower frequencies increase the ability of EM signals to pass through more materials but limit the resolution of the reflected EM signal data.

The radar signature can be influenced by the interaction of the objects with the EM radiation coming from the radar sensor. The reflection which is the RCS received by the radar, as well as what is not received, i.e. absorption by the objects and/or transmission through the objects, are also information the system can use to analyze and identify the hazardous materials scanned via the ML processing of the sensor data. In some embodiments, the processor can use machine learning to analyze radar signals to quickly, accurately, and non-destructively detect hazardous materials such as lithium-ion batteries.

Figure 15:
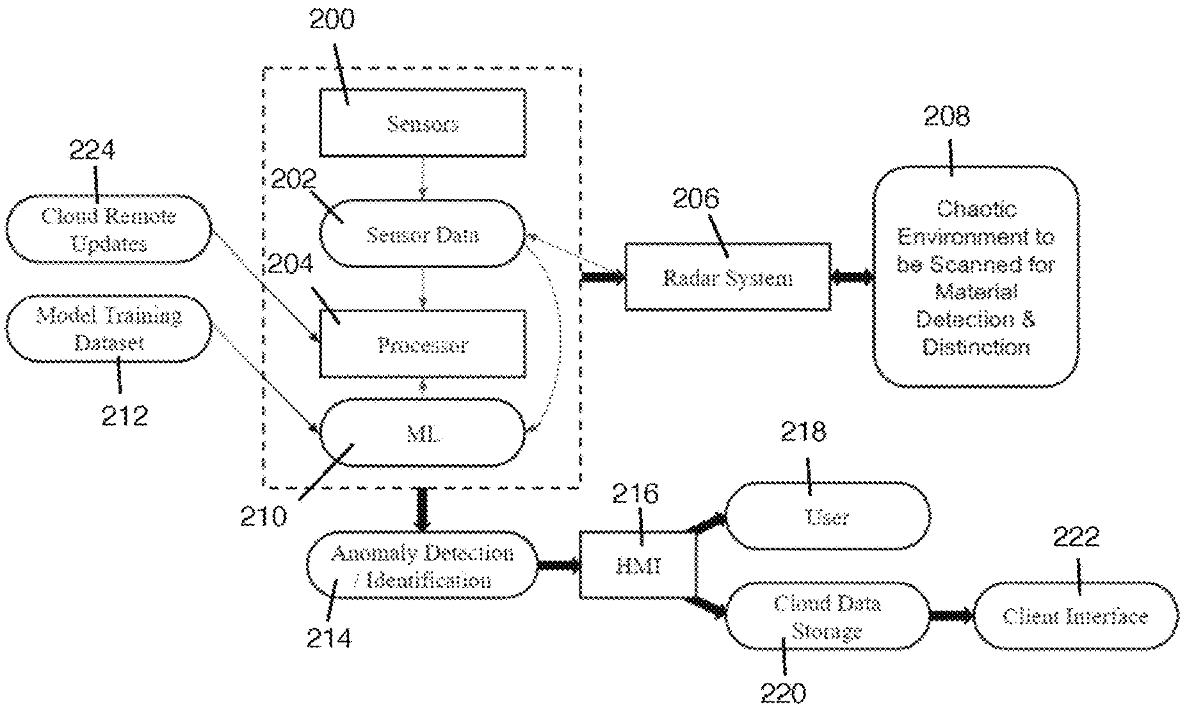
FIG. 15 illustrates a block diagram of a material detection system aided by machine learning.

FIG. 15 is a block diagram of an embodiment of a material detection system aided by machine learning. The material detection system can consist of sensors 200, a processor 204, a radar system 206, sensor data 202, machine learning (ML) 210, a model training dataset 212, anomaly detection or identification 214, a human machine interface (HMI) 216, a user 218, cloud data storage 220, a client interface 222, and cloud remote updates 224.

The radar system 206 can emit EM signals at a chaotic environment to be scanned for material detection and distinction 208 that can be the mixed and possibly compressed objects in the waste bins or dumpsters. As discussed, some of the EM signals can be absorbed or transmitted through the chaotic environment and receive the reflected EM signals. The sensor data 202

The sensors 200 can be extraneous from the radar system 206 and can be defined as separate entities due to their distinct functionality. For example, the sensors 200 can include, but are not limited to accelerometers, gyroscopes, magnetometers, temperature sensors, humidity sensors, and any and all other sensors critical for assessing the environment in which the detecting system is to be deployed. The temperature sensors can be thermocouples, thermistors, infrared sensors, or other temperature detection mechanisms. The humidity sensors can be hygrometers, resistive humidity sensors, or other humidity detection mechanisms. The sensors 200 can provide sensor data 202 regarding ambient environmental conditions during the waste bin sensing to the processor 204. The ambient environmental conditions can alter the hazardous material detection data detected by the radar system 206.

The sensors 200 may, for example, provide relevant sensor data 202 to trigger the deployment of the radar detection system. For example, if the environmental conditions and sensor data 202 provided by the sensors 200 are all within the normal operating range for the radar system 206, the processor 204 can provide instructions for the radar system 206 to operate and detect hazardous materials as described above. Conversely, if the environmental conditions and sensor data 202 provided by the sensors 200 are all within the normal operating range for the radar system 206, the processor 204 can trigger an alert indicating anomalous environmental conditions that can result in erroneous operating of the radar system 206. The processor 204 can respond to anomalous environmental conditions trigger data from the sensors 200 or the detection system to be stored or flagged within the cloud data storage 220, or trigger notification to the client interface 222.

Sensor data 202 can include data from the radar system 206 and data from the aforementioned sensors 200 regardless of the function of that data. Sensor data 202 may be used for varying purposes, such as confirming the required environmental operating conditions for the deployment of the hazardous material detection system, emergency shutoff of the system, and/or alerting a system user and a system client with actionable or non-actionable information.

The processor 204 may interpret and process the sensor data 202 gathered by the system's sensors 200 and radar system 206. The processor 204 can perform filtration, aggregation, analysis, preliminary decision-making, and pattern recognition, predictive analysis, and anomaly detection 214 via machine learning algorithms 210 running on the processor 204. The processor 204 can be an edge device, a central processing unit (CPU), an embedded processor, an industrial processor, and networking equipment such as routers or switches.

The radar system 206, consisting of one or more radar modules that can scan the chaotic environment 208 within a waste bin or a dumpster. The radar data from the chaotic environment 208, i.e., the radar portion of the sensor data 202 can be transmitted to the processor 204 and processed via machine learning 210 that is trained by the model training dataset 212. In operation, the radar system 206 can transmit an EM signal in the direction of interest such as a waste bin or a dumpster. The EM signal can be directed for example, by the physical positioning of the radar sensor, beamforming, and/or beam steering. Some of the EM signals can be reflected and these reflected signals can be received by the radar sensor. The reflected signals can then be sent to the machine learning-backed 210 processor 204 for anomaly detection or identification 214. The anomaly detection or identification 214 is achieved in this example by the machine learning 210 that performs anomaly recognition using the large model training dataset 212. The processor 204 backed by machine learning 210 may recognize the anomaly such as a detected hazardous object based on feature data extracted from radar sensor data 202 collected by the radar system 206.

The human machine interface (HMI) 216 in this example can be an output apparatus that receives alert signals from the processor to alert the user 218 of the anomaly detection or identification 214. The HMI 216 can include but is not limited to, an electronic display device such as a mobile phone or tablet, fixed digital displays such as an LED screen or LCD monitor, non-visual signal interfaces such as LED lights, buzzers, or other audio-visual signaling mechanisms that communicate alerts without screen use, tactile feedback devices that provide physical feedback to the user, wearable interface devices, context-aware interfaces, augmented reality interfaces, or other suitable notification mechanisms.

The user 218 can interact with the HMI 216 for either actionable or non-actionable purposes and may use the HMI 216 to report to the client interface 222. Via, for example, cellular data or WIFI, the HMI may be used to report anomaly detection alerts via cloud data storage 220 to the client interface 222. Cloud data storage 220 may be, for example, but is not limited to, a data lake or a database.

In some embodiments, the client interface 222 can be a desktop or mobile computing device such as a tablet or phone running a software application program that logs reports of the anomaly detection 214 with functionalities for their analysis. The client interface 222 may communicate with the processor 204 and/or cloud storage 220 through a wired connection or a wireless communications network. The client interface 222 may be integrated with a client's CRM for streamlined reporting into a singular system for greater analysis of workflow, integration with other reports, processes, or systems, and accessibility across multiple platforms as needed.

Remote cloud updates 224 may be used to update the machine learning datasets 212 used by the processor 204 for the detection and extraction of sensor data 202 used to detect hazardous materials in the chaotic environment 208. Remote cloud updates 224 may be used to alter the thresholds in which collected sensor data 202 triggers an actionable detection event where the processor 204 would alert the user 218 or client through the client interface 222.

Overview of Data Collection

The data collection process for our machine learning model involves comprehensive data acquisition from both physical and simulated environments. In physical settings, we meticulously gather environmental data by scanning scenarios that contain hazardous materials. To enhance the richness and variability of our datasets, we also manipulate digital representations of 3D and 2D objects in simulated environments. This dual approach ensures a robust dataset that mimics real-world complexities.

Methodology for Data Handling

Our methodology is highly methodical, focusing on the detailed capturing of physical environments. We then transfer this data into simulation platforms for further replication and augmentation. Metadata related to each object's complexity is stored, facilitating more profound analysis and more effective learning outcomes for the machine learning models. Preprocessing methods can be crucial for enhancing signal clarity and reducing noise, thereby refining the data before it enters the iterative machine learning phase.

Data Analysis and Machine Learning Techniques

For data analysis, we utilize two main approaches: time-series data assessment and various transformation into 2D imagery. We can utilize, and not limited to, autoencoding and dimensionality reduction on time series data, or for 2d transformations—training convolutional neural networks (CNNs), which excel in recognizing complex patterns and features indicative of hazardous materials. Our flexibility in applying CNNs and other models in multiple capacities allows us to continually adapt to new types of hazardous materials as they are identified. CNNS will likely be complementary only with the integration of other sensors for sensor fusion and applied Computer Vision methods. It should be noted that it is ideal to get to our desired signal reading and model instance result with as low latency as possible. This entails keeping the machine learning lower level than 2d unless needed.

In some embodiments, it can be possible to replace or supplement the described radar sensor detection system with an x-ray sensor. While the described radar based hazardous material detection can be based on the conductivity of materials, x-ray can identify materials based on density and atomic number of the materials. X-ray sensor data can result in a higher accuracy in differentiating between hazardous and non-hazardous items and materials. The x-ray sensor can be coupled to a process and a memory that can store x-ray image data for hazardous materials. The X-ray sensor can take an image(s) of the contents of bins or dumpsters and forward this X-ray image data to the processor. The processor can then compare the X-ray image data to stored known hazardous material X-ray images to determine. If there is a match the X-rayed object(s) can be identified as hazardous materials and all further mechanical processing can be stopped. If the X-ray image data does not match the stored known hazardous material X-ray images then the system can determine that there are no known hazardous materials and further mechanical waste processing can proceed. By directly imaging the waste objects or materials and comparing these images to known and stored profiles of hazardous materials, the system accuracy can be improved and the x-ray sensor can reduce the incidence of false positives that may occur with pure radar sensor systems.

In some embodiments, the inventive system can use both radar and x-ray sensors. If the radar sensor technology does not detect any hazardous objects or materials, the x-ray sensor may not be used and the waste processing can proceed as normal. However, in the event that the radar sensor technology detects a hazardous object or material such as a lithium ion battery, the x-ray sensor can then be deployed with an emitter to directing x-rays at the suspected object or materials and receiver on the opposite side of the object or materials for receiving the x-rays. The received x-ray image can be used to verify the presence of hazardous materials such as a lithium ion battery or non-presence of hazardous materials. If the x-ray sensor verifies the presence of hazardous materials, a hazardous material warning signal can be sent to an output device to notify the system operator. In the event that the x-ray system does not detect any hazardous materials such as a lithium ion battery, the hazardous material warning signal is not sent, to mitigate a false positive from the radar sensor.

In other embodiments, the inventive system can use both radar and x-ray sensors for initial detection of hazardous or non-hazardous materials. The received x-ray image can be used to aid and strengthen the ML model for the radar system to detect both hazardous and non-hazardous materials. The received x-ray image can also be used by the processor to direct a PAA capable of beam steering to the hazardous material detected by the x-ray.

In other embodiments, the hazardous material detection system can use a pure x-ray sensor without the described radar system. In the event that the system relies purely on an x-ray sensor, the system can rely solely on AI that is trained on a database of x-ray scans of hazardous materials such as lithium ion batteries that can be developed to then allow for the system to identify whether if there is a battery present or not, or identify whether if there is hazardous waste present or not.

Figure 16A:
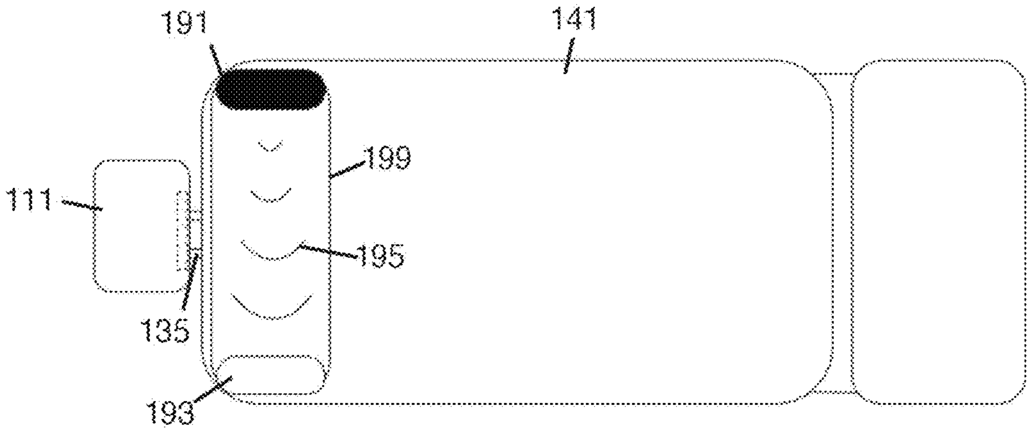
FIG. 16A illustrates a top view of a waste collection truck with a rear loader holding a curbside bin.
Figure 16B:
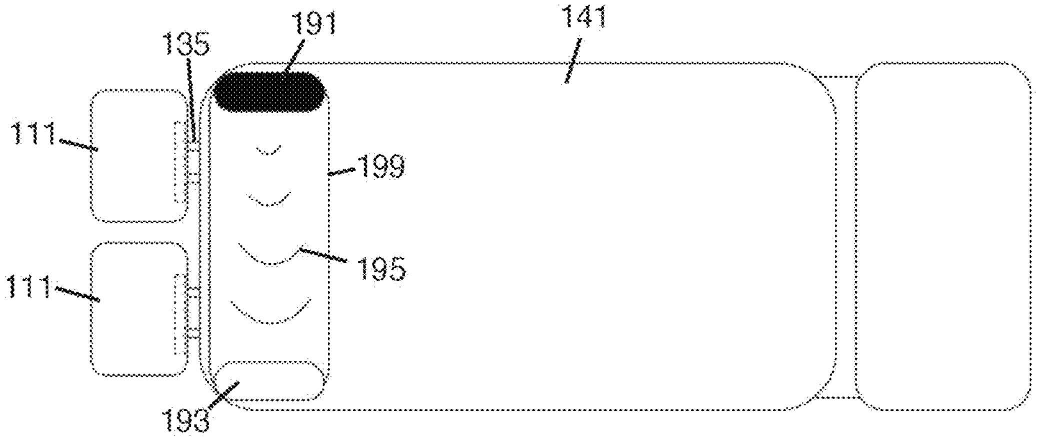
FIG. 16B illustrates a top view of a waste collection truck with a rear loader holding two curbside bins.
Figure 16C:
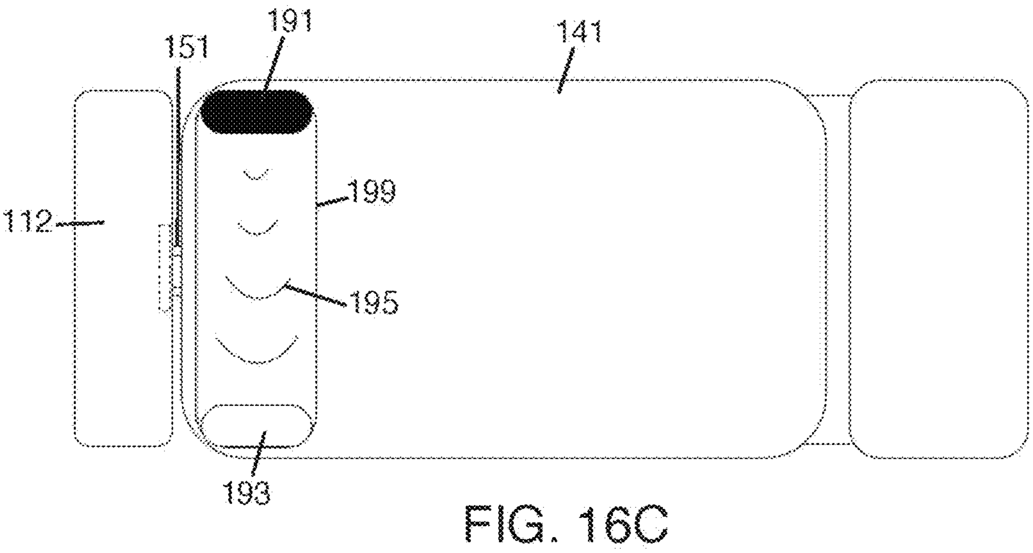
FIG. 16C illustrates a top view of a waste collection truck with a rear loader holding a dumpster.

FIGS. 16A-16C illustrate different embodiments of a waste collection truck that includes an x-ray hazardous material detection system. FIG. 16A illustrates a single curbside bin 111 on a rear loader 135 coupled to a waste collection truck 141. FIG. 16B illustrates two curbside bins 111 on a rear loader 135 coupled to a waste collection truck 141. FIG. 16C illustrates dumpster 112 on a rear loader 151 coupled to a waste collection truck 141. In contrast to the radar sensor that projects radar electromagnetic waves away from the waste collection truck 141, the x-ray system can have an x-ray emitter 191 that transmits x-rays 195 and an x-ray receiver 193 that receives x-rays 195 all within the rear portion of the waste collection truck 141. In the illustrated example, x-ray emitter 191 is at a rear right portion of the waste collection truck 141 and the x-ray receiver 193 is at a left rear portion of the waste collection truck 141. The x-rays 195 are transmitted across the rear portion of the waste collection truck 141.

It is well known that x-ray radiation can be hazardous to humans and animals. The rear portion of the waste collection truck 141 can include protective materials such as lead layers to provide shielding around the x-ray volume 199 so that x-rays are not transmitted beyond or away from the rear portion of the waste collection truck 141. In some embodiments, the bins 111 or dumpsters 112 can be moved into the x-ray volume 199 and exposed to x-rays 195 before the bins 111 or dumpsters 112 are emptied into the waste collection truck 141. If hazardous materials are detected, the bins 111 or dumpster 112 can be removed from the waste collection truck 141 with the lifting mechanism 189 and returned to the curb. If hazardous materials or objects are detected, the system can transmit hazardous material warning signals to the truck operator and a system server as described above for the radar systems.

Figure 17:
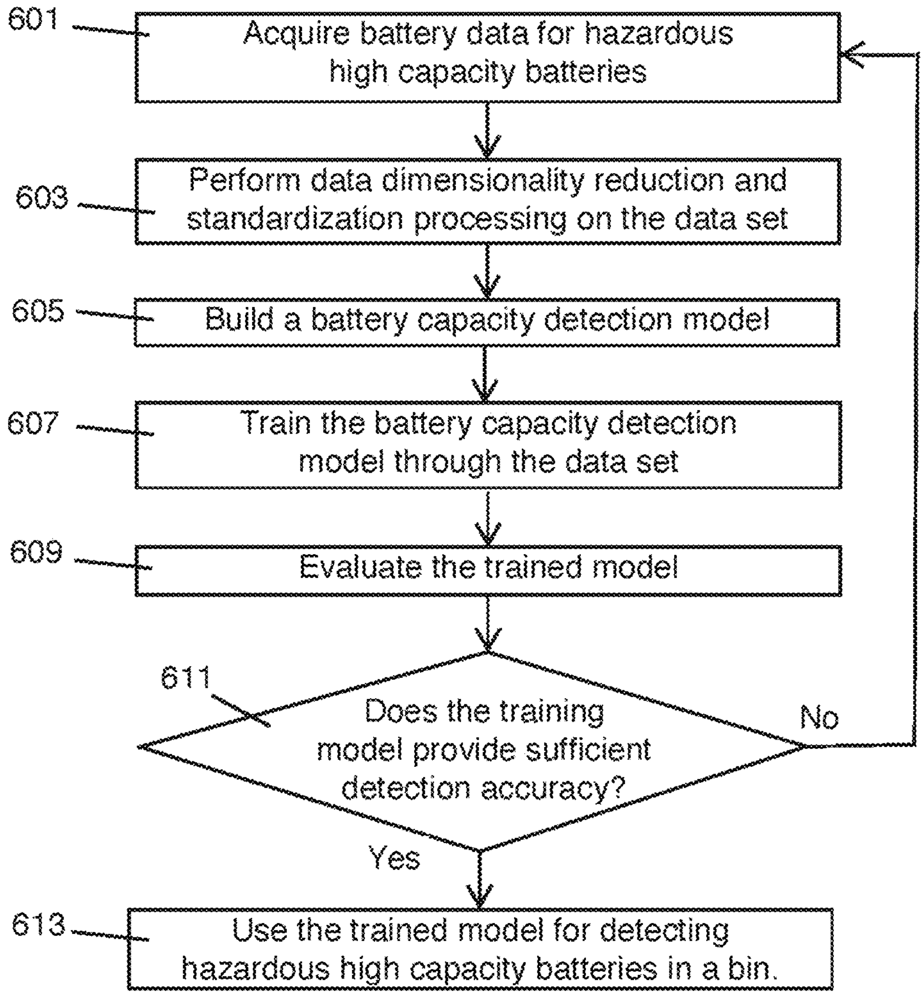
FIG. 17 illustrates a flowchart for the integrated machine learning (ML) training model process.

FIG. 17 illustrates a flowchart for the integrated machine learning training model process. The machine learning method can comprise the following steps: Acquire battery data and construct a battery data set based on the battery data 601; Perform data dimensionality reduction and standardization processing on the battery data set 603; 3. Build a battery capacity detection model 605, train the battery capacity detection model through the battery data set 607, and evaluate the trained model 609; and 4. Does the training model provide sufficient hazardous battery detection accuracy 611? If the accuracy is insufficient, the process can be repeated. If the hazardous battery detection accuracy is sufficient, the trained model can be used for detecting hazardous high capacity batteries. 613.

The trained model can be used as described above for model training dataset 212 in FIG. 15 and can allow the system to perform real-time online detection of hazardous material batteries. In some embodiments, the battery data used in the model training dataset can include battery low-frequency noise data, battery voltage, battery internal resistance, number of battery charge, and discharge cycles, and battery capacity data.

A possible battery capacity detection method can be based on the factory setting parameters provided by the battery manufacturers. However, the measurement accuracy based on the factory setting parameters can be inaccurate. An alternative second battery capacity detection method can use artificial periodic correction of the battery capacities. However, this method may not take into account the actual operation of the battery, such as the battery operating temperature, battery charge and discharge status, and whether it is affected by extrusion installation, etc., which cannot be real-time accurate volume measurement. Therefore, it can be urgent to propose a machine learning-based ternary lithium battery capacity detection method to solve the technical problem of how to accurately and quickly perform accurate and nondestructive detection of battery capacity and output the results.

In some embodiments, the system can use deep learning methods that can expedite the ability of the system to sift through the large quantity of information that is returned reflected radar signature data detected by the system sensors and processed by the processor. Long Short-Term Memory (LSTM) networks can analyze the temporal sequences in the radar data, capturing time-dependent and therefore frequency-dependent radar data. By knowing which frequencies the radar deploys at what time can help the system identify data features of the radar sensor data to help identify the scanned materials. Mixture Density Networks (MDNs) can model the output distributions, which can mitigate uncertainties, variations, and noise from unwanted radar reflections that can be reflections from non-battery materials.

In different possible embodiments, the inventive system can also utilize various different types of neural networks. For example, in some embodiments, the system can utilize Gaussian Mixture Models (GMMs) that can model the distribution of radar signal responses from different radar scanned materials, and cluster similar data together based on several overlapping Gaussian distributions where similar data is assessed via multiple variances and means. The anomaly detection of a lithium-ion battery by GMMs can result from radar scans that return radar signatures that fall into the clusters that correspond to radar signatures of known lithium-ion battery signatures that the GMM was trained with.

In some embodiments, the system can use Recurrent Neural Networks (RNNs) that can also track temporal sequences in radar data, so the time-dependent signature returned along with the known change in the transmitted radar frequencies can be used to identify composite materials and composite structures such as lithium-ion batteries. A combination of RNNs and GMMs can leverage the temporal facet of RNNs and the Gaussian probabilities of GMM. More specifically, the RNN can identify the time-dependent radar signatures, which the GMM can then cluster based on the RNN identifications.

In some embodiments, the system can use Gaussian Mixture Model Tensor Recurrent Neural Network (GMM-TRNN) which is a type of algorithm that can process the multi-dimensionality of the radar data (tensor processing). Dimensions of the radar signatures can include time, frequency (FFT's), amplitude (reflectivity), phase, range and doppler, spatial, and polarization.

In some embodiments, the system can use Hidden Markov Model (HMM)-based RNN that can infer lithium-ion battery radar signatures in reflections that are partially obscured by other highly reflective materials that the lithium-ion batteries can be mixed with. For example, aluminum cans can be moderately to highly radar EM signal reflective and a common recyclable. It can be possible to identify lithium-ion battery radar signatures that are partially obscured by aluminum cans or other highly radar reflective materials.

Figure 18:
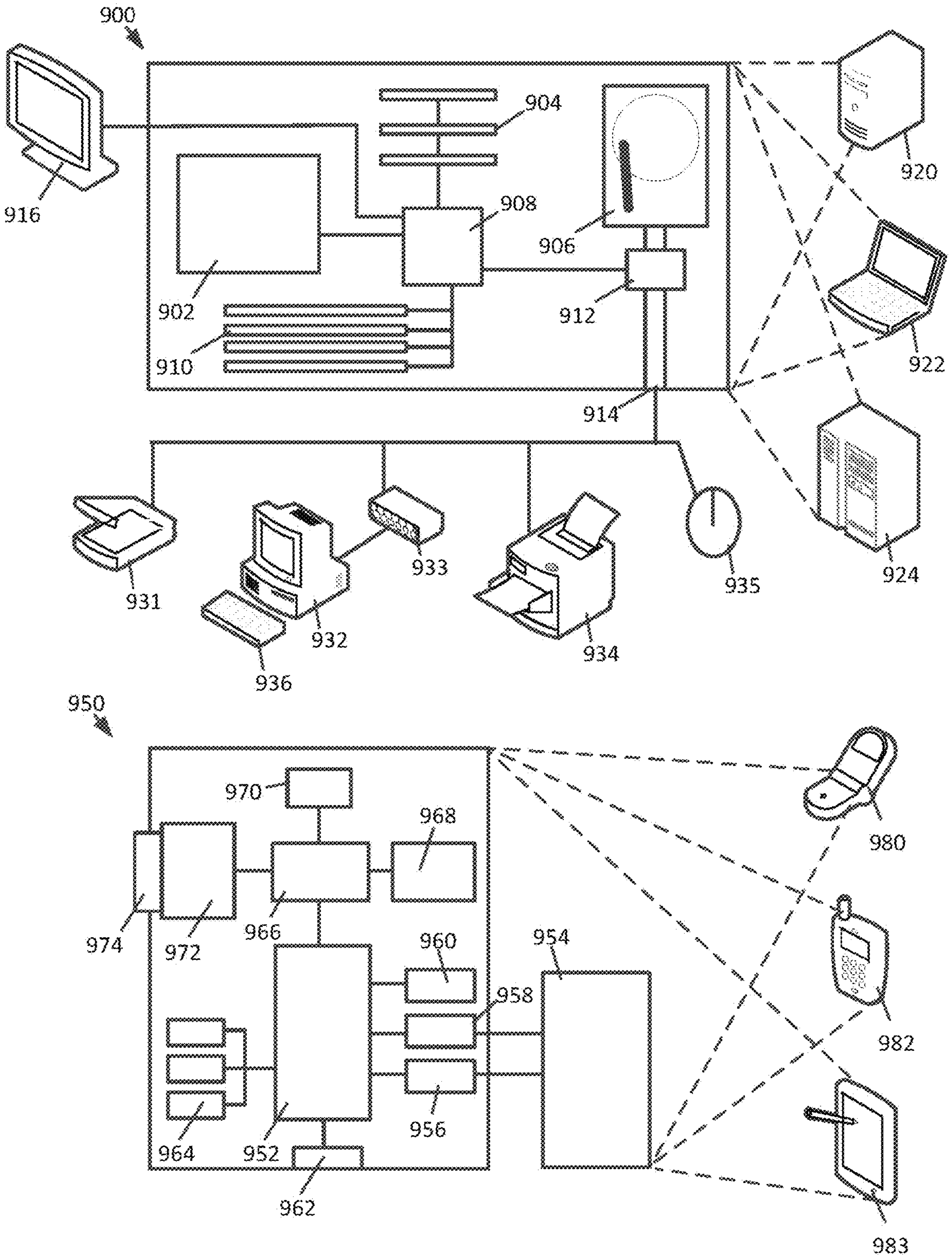
FIG. 18 illustrates a diagram of a computer system.

FIG. 18 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention and some of its advantages have been described in detail for some embodiments. It should be understood that although the process is described with reference to a device, system, and method the process may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A hazardous material detection apparatus comprising:

a vehicle equipped with a storage container;

a lifting mechanism coupled to the vehicle, the lifting mechanism configured to engage and lift a holding container;

a sensor assembly mounted on a bracket attached to a lifting mechanism, the sensor assembly including a first transmitter configured to transmit first electromagnetic detection signals towards materials within the holding container and a first receiver configured to receive first electromagnetic material detection signals;

wherein the sensor assembly comprises a frequency modulated continuous wave (FMCW) radar with the transmitter and the receiver including radar phased array antennas (PAAs) that beamform a radio frequency signal emitted by the PAAs transmitter;

a processor in communication with the sensor assembly, the processor configured to analyze the first electromagnetic material detection signals and identify a hazardous material characteristic, including a lithium-ion battery characteristic; and an output device in communication with the processor;

wherein when the processor identifies the hazardous material characteristic, the processor sends a warning signal to the output device and the output device emits a warning output, and a stop mechanism in communication with the processor and the lifting mechanism, wherein the processor actuates the stop mechanism to prevent the lifting mechanism from lifting the holding container when the processor has identified the hazardous battery.

2. The hazardous material detection apparatus of claim 1, wherein the sensor assembly includes a second transmitter configured to transmit second electromagnetic detection signals towards materials within the holding container and a second receiver configured to receive second electromagnetic material detection signals, the first electromagnetic detection signals are a different frequency than the second electromagnetic detection signals and the first electromagnetic material detection signals are a different frequency than the second electromagnetic material detection signals and the processor is configured to analyze the first and second electromagnetic material detection signals and identify a hazardous material characteristic, including a lithium-ion battery.

3. The hazardous material detection apparatus of claim 1 further comprising:

a bin grasping mechanism coupled to the lifting mechanism.

4. The hazardous material detection apparatus of claim 1 further comprising:

an alarm output device in communication with the processor wherein the processor transmits a hazardous material signal to the alarm output device when the hazardous battery is detected.

5. The hazardous material detection apparatus of claim 1, wherein the sensor assembly emits signals at a frequency range of 20-30 GHz or 8-13 GHz for penetrating the holding container and contacting a hazardous material in the holding container.

6. The hazardous material detection apparatus of claim 1 further comprising:

a location sensor in communication with the processor, and a communications transmitter in communication with the processor;

wherein when the processor identifies the hazardous battery, the processor acquires a location from the location sensor and the processor sends a hazardous battery location signal through the communications transmitter to authorized receivers.

7. A hazardous material detection apparatus comprising:

a sensor assembly including a first transmitter configured to transmit first electromagnetic detection signals towards materials within a holding container and a first receiver configured to receive first electromagnetic material detection signals; and a second transmitter configured to transmit second electromagnetic detection signals towards materials within the holding container and a second receiver configured to receive second electromagnetic material detection signals, the first electromagnetic detection signals are a different frequency than the second electromagnetic detection signals and the first electromagnetic material detection signals are a different frequency than the second electromagnetic material detection signals;

a bracket attaching the sensor assembly to a lifting mechanism;

a processor in communication with the sensor assembly, the processor configured to analyze the first and second electromagnetic material detection signals and identify a hazardous material, including a lithium-ion battery; and an output device in communication with the processor;

wherein when the processor identifies the hazardous material, the processor sends a warning signal to the output device and the output device emits a warning output, and a stop mechanism in communication with the processor and the lifting mechanism, wherein the processor actuates the stop mechanism to prevent the lifting mechanism from lifting the holding container when the processor has identified the hazardous battery.

8. The hazardous material detection apparatus of claim 7, wherein the sensor assembly comprises at least one frequency-modulated continuous wave (FMCW) radar with the transmitter and the receiver including radar phased array antennas (PAAs) that beamform a radio frequency signal emitted by the transmitter.

9. The hazardous material detection apparatus of claim 8 further comprising:

a bin grasping mechanism coupled to the lifting mechanism.

10. The hazardous material detection apparatus of claim 8 further comprising:

an alarm output device in communication with the processor wherein the processor transmits a hazardous material signal to the alarm output device when the hazardous battery is detected.

11. The hazardous material detection apparatus of claim 8, wherein the first transmitter is mounted on the bracket on a first side of the lifting mechanism and the second transmitter is mounted on a bracket on a second side of the lifting mechanism that is opposite the first side.

12. The hazardous material detection apparatus of claim 8, wherein the first transmitter emits signals at a frequency range of 20-30 GHz, and the second transmitter emits signals at a frequency range of 8-13 GHz, for penetrating the holding container and contacting the hazardous battery in the holding container.

13. The hazardous material detection apparatus of claim 8 further comprising:

a location sensor in communication with the processor, and a communications transmitter in communication with the processor;

wherein when the processor identifies the hazardous battery, the processor acquires a location from the location sensor and the processor sends a hazardous battery location signal through the communications transmitter to authorized receivers.

* * * * *